(12) United States Patent
Agarwal et al.

(10) Patent No.: US 9,558,506 B2
(45) Date of Patent: Jan. 31, 2017

(54) SYSTEM AND METHOD FOR EXPLORING NEW SPONSORED SEARCH LISTINGS OF UNCERTAIN QUALITY

(75) Inventors: Deepak K. Agarwal, Sunnyvale, CA (US); Dz-Mou Jung, Arcadia, CA (US); Sai-Ming Li, Santa Clara, CA (US); Mohammad Mahdian, Santa Clara, CA (US); R. Preston McAfee, San Marino, CA (US); Shanmugasundaram Ravikumar, Santa Clara, CA (US); David Reiley, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 689 days.

(21) Appl. No.: 12/700,530

(22) Filed: Feb. 4, 2010

(65) Prior Publication Data
US 2011/0191167 A1    Aug. 4, 2011

(51) Int. Cl.
*G06Q 30/00* (2012.01)
*G06Q 30/02* (2012.01)

(52) U.S. Cl.
CPC ...... *G06Q 30/0246* (2013.01); *G06Q 30/0275* (2013.01)

(58) Field of Classification Search
CPC combination set(s) only.
See application file for complete search history.

(56) References Cited

U.S. PATENT DOCUMENTS

| 6,871,190 B1* | 3/2005 | Seymour ............... G06Q 40/04 705/26.3 |
| 6,892,186 B1* | 5/2005 | Preist .................... G06Q 40/04 705/26.3 |
| 2006/0111985 A1 | 5/2006 | Sheldon et al. |
| 2006/0184417 A1 | 8/2006 | Van der Linden et al. |
| 2006/0212350 A1 | 9/2006 | Ellis et al. |
| 2007/0174180 A1 | 7/2007 | Shin |
| 2007/0179846 A1 | 8/2007 | Jain et al. |
| 2007/0179856 A1 | 8/2007 | O'Kelley |
| 2007/0239560 A1 | 10/2007 | McGuire et al. |
| 2008/0275775 A1* | 11/2008 | Gonen .................. G06Q 30/02 705/14.71 |
| 2008/0306819 A1 | 12/2008 | Berkhin et al. |
| 2010/0161438 A1* | 6/2010 | Tomak ................. G06Q 30/08 705/26.1 |

(Continued)

OTHER PUBLICATIONS

Patent Application filed Jan. 6, 2010 in co-pending U.S. Appl. No. 12/683,247, 49 pages.

(Continued)

*Primary Examiner* — Matthew T Sittner
(74) *Attorney, Agent, or Firm* — Berkeley Law & Technology Group, LLP

(57) ABSTRACT

According to some example embodiments, a method includes calculating learning values associated with a plurality of listings, at least one of said learning values associated with one of said listings representing a value based, at least in part, on a probability distribution of selections of said listing. The method further includes applying said learning values to ranking scores associated with said listings to provide an updated ranking, and electronically auctioning advertising inventory to purchasers associated with said listings based, at least in part, on said updated ranking.

19 Claims, 4 Drawing Sheets

(56) References Cited

U.S. PATENT DOCUMENTS

2011/0173063 A1* 7/2011 Bhatia .................. G06Q 30/02
                                                    705/14.45

OTHER PUBLICATIONS

Sharad Goel, et al., "Contract Auctions for Sponsored Search", Yahoo! Research, 15 pages, New York, New York.

Sihem Amer-Yahia, et al., "Towards a Generic Bidding Standard for Online Advertising", 2008, 8 pages, Yahoo Research, Fourth Workshop on Ad Auctions, New York, New York.

Ashish Goel, et al., "Hybrid Keyword Search Auctions", Jan. 26, 2009, 18 pages, Proceedings of the 18th International World Wide Web Conference.

Matthew Richardson, et al., Predicting Clicks: Estimating the Click-Through Rate for New Ads, May 8-12, 2007, pp. 521-529, Proceedings of the 16th International World Wide Web Conference, Banff, Alberta, Canada.

U.S. Appl. No. 12/683,247, filed Jan. 6, 2010, 59 Pages.

U.S. Appl. No. 12/683,247 Filing Receipt, Mailed Jan. 21, 2010, 3 Pages.

U.S. Appl. No. 12/683,247 Notice of Publication, Mailed Jul. 7, 2011, 1 Page.

U.S. Appl. No. 12/683,247 Non-Final Office Action, Mailed Jul. 30, 2012, 36 Pages.

U.S. Appl. No. 12/683,247 Non-Final Office Action Response, Mailed Oct. 30, 2012, 23 Pages.

U.S. Appl. No. 12/683,247 Final Office Action, Mailed Jan. 24, 2013, 31 Pages.

U.S. Appl. No. 12/683,247 Request for Continued Examination, Mailed Apr. 24, 2013, 45 Pages.

U.S. Appl. No. 12/683,247 Non-Final Office Action, Mailed Nov. 13, 2013, 21 Pages.

U.S. Appl. No. 12/683,247 Non-Final Office Action Response, Mailed Feb. 13, 2014, 16 pages.

U.S. Appl. No. 12/683,247 Final Office Action, Mailed Apr. 8, 2014, 22 Pages.

U.S. Appl. No. 12/683,247 Response After Final Action, Mailed Jun. 9, 2014, 19 Pages.

U.S. Appl. No. 12/683,247 Advisory Action (PTOL-303), Mailed Jun. 13, 2014, 4 Pages.

U.S. Appl. No. 12/683,247 Request for Continued Examination, Mailed Aug. 8, 2014, 20 Pages.

Sharad, Goel, et al., "Contract Auctions for Sponsored Search", Yahoo! Research, 15 pages, New York, New York.

Sihem Amer-Yahia, et al., "Towards a Generic Bidding Standard for Online Advertising", 20008, 8 pages, Yahoo Research, Fourth Workshop on Ad Auctions, New York, New York.

Ashish Goel, et al., "Hybrid Keyword Search Auctions", Jan. 26, 2009, 18 pages, Proceedings of the $18^{th}$ International World Wide Web Conference.

Matthew Richardson, et al., Predicting Clicks: Estimating the Click-Through Rate for New Ads, May 8-12, 2007, pp. 521-529, Proceedings of the $16^{th}$ International World Wide Web Conference, Banff, Alberta, Canada.

Merriman Webster, Salary, Mar. 31, 2014, An Encyclopedia Britannica Company.

Trademark Electronic Search System (TESS), Yahoo!., Jul. 24, 2012, United States Patent and Trademark Office.

Trademark Electronic Search System (TESS), XHTML, Jul. 24, 2012, United States Patent and Trademark Office.

\* cited by examiner

SYSTEM AND METHOD FOR EXPLORING NEW SPONSORED SEARCH LISTINGS OF UNCERTAIN QUALITY

BACKGROUND

1. Technical Field

The subject matter disclosed herein relates to a system and method for exploring new sponsored search listings and other pay-for-performance advertisement of uncertain quality.

2. Description of the Related Art

Sponsored search is a large and rapidly growing advertising platform and a major source of revenue generated over the Internet by search engine companies. With a high volume of Internet searches performed every day, search results web pages may represent a commercially-viable advertising medium allowing advertisers to achieve complex advertising goals (e.g., build brand awareness, attract specific customers, target segmented markets, generate web traffic, implement behavioral targeting, etc.).

Typically, although not necessarily, sponsored search advertising may involve a publisher or advertisement provider, such as, for example, a search engine Yahoo! Search™, running an auction among multiple advertisers to sell an advertising inventory or space on its search results web pages returned to a user in response to one or more search terms (e.g., a query). To participate in these auctions, advertisers may select one or more keywords that are descriptive of or otherwise related to their businesses, and may submit bids on each of such keywords to have their advertisement, or listing, shown next to the search results when a user's query matches a particular keyword.

As used herein, a "publisher" may be defined as an entity having a revenue model based at least in part on selling advertising inventory or advertising space associated with sponsored search results web pages to advertisers. Some non-limiting examples of publishers may include, for instance, Yahoo!, Google, and Ask. Advertising inventory may include, for example, spaces that are reserved for advertisements on a publisher's sponsored search results web page. As used herein, an "advertiser" may comprise an entity that desires to place a listing on a publisher's sponsored search results web pages.

A publisher may select advertisements and their relative placement (e.g., their positions or slots relative to other advertisements) on a search results web page based on certain pricing rules and/or transaction mechanisms. Such mechanisms may include, for example, a cost-per-click (CPC) pricing in which an advertiser may pay a publisher every time a search engine user clicks on a displayed advertisement from the advertiser. Another example is a cost-per-impression (CPM) pricing that may allow a publisher to charge an advertiser according to the number of times (e.g., a thousand, etc.) its advertisement is shown to search engine users (e.g., for a chance to be viewed by and/or to make an impression on potential customers). Optionally or alternatively, a publisher may charge an advertiser conditioned on whether the displaying of a particular advertisement leads to some desired event or action by a search engine user on the advertiser's web site (e.g., sale of an advertised product, participation in surveys or sweepstakes, etc.) in accordance with a cost-per-action (CPA) pricing, for example. From the publisher perspective, the objective under any of these pricing mechanisms is to maximize the expected revenue per impression, given the strategic nature of advertisers' bids, while providing a reasonable advertisers' return for a given advertising budget (e.g., the number of clicks, impressions, purchases, etc. per daily or weekly cost incurred). In addition, for some advertisers, one-dimensional bids (e.g., restricted to bidding on only one feature, such as, CPC, or CPM, or CPA, etc.), for example, may not be sufficiently expressive to convey their valuations or preferences.

Revenue from sponsored search advertising may drive much of the innovation that occurs in Internet technology in general and search engine services in particular. Accordingly, as Internet commerce evolves, it may be desirable to develop one or more methods, systems, and/or apparatuses that implement efficient pricing and/or transaction mechanisms which may improve the overall efficiency of the auction market (e.g., by reducing or eliminating strategic bidding behavior, etc.) while increasing publishers' revenue and/or optimizing advertisers' return on investments.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
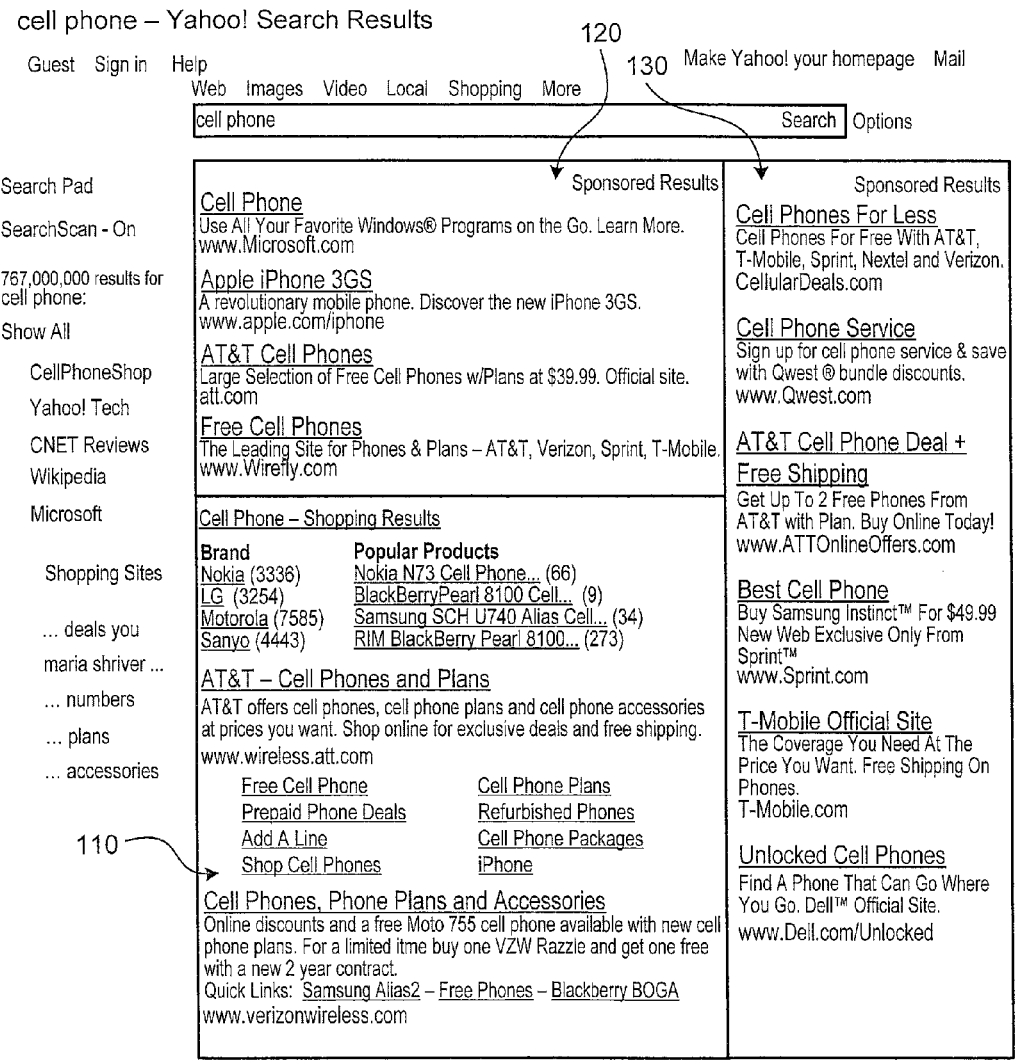
FIG. 1 is a screenshot illustrating a sponsored search page for the keyword "cell phone."

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, and articles of manufacture are disclosed herein that may be used for selection and/or pricing of advertisers' bids for sponsored search auctions. As used herein, "sponsored search" may refer to a form of search engine marketing and/or advertising (e.g., textual, graphical, etc.) that may increase the visibility and/or marketability of advertisers' products, for example, by placing targeted listings or advertisements (e.g., contextual, geographic, demographic, etc.) on search terms (e.g., queries) next to search results in returned search result web pages.

As will be described in greater detail below, a selection and/or assignment of listings to certain advertising positions or slots within a web page may be determined by an on-line auction among advertisers who may bid on specific keywords that match a query. As used herein, "bidder," and/or the plural form of such term may refer to an individual person or persons and/or entities that may be capable of participating, directly or indirectly (e.g., via an agent, etc.), in a market for a product or service. In a particular example, an advertiser may comprise a bidder for on-line and/or off-line advertising inventory or space. In some implementations, an auction may provide one or more techniques for determining a price that one or more winning advertisers may pay to an advertisement provider or publisher, as will also be seen.

Before describing some example methods, apparatuses, and articles of manufacture in greater detail, the sections below will first introduce certain aspects of an example operating environment, computing or otherwise, in which sponsored search auctions may be performed. It should be appreciated, however, that techniques provided herein and claimed subject matter is not limited to these example implementations. For example, techniques provided herein may be adapted for use in a variety of information processing environments (e.g., electronic exchange, database applications, etc.), as well as in off-line transaction models (e.g., book publishing, insurance, executive compensation, etc.), as will be seen. In addition, any implementations and/or configurations described herein as "example" are described for purposes of illustration and are not to be construed as preferred or desired over other implementations and/or configurations.

Considering the enormous amount of information available on the World Wide Web, it may be desirable to employ one or more search engine services to help a user to locate and efficiently retrieve one or more web documents that may be of particular and/or possible interest to such a user. A "web document," as the term used herein, is to be interpreted broadly and may include one or more signals representing any source code, search result, advertisement, file, and/or data that may be read by a special purpose computing apparatus during a search and that may be played and/or displayed to a search engine user. As a way of illustration, web documents may include a web page, an e-mail message, an Extensible Markup Language (XML) document, a media file (e.g., a graphical advertisement, etc.), and/or the like, and any combinations thereof. A web page may contain one or more embedded references (e.g., hyperlinks) to text, images, audio, video, and/or other web documents.

As a way of illustration, a search engine user may submit or otherwise specify one or more search terms (e.g., a query) into a search engine and may, in response, receive and view a web page that may include a set of search results listed in a particular order. A user may subsequently access a particular web document by clicking on a hyperlink or other selectable tool embedded in or otherwise associated with such a document. As used in the present application, "click" or "clicking" may refer to a selection process made by any pointing device, such as, for example, a mouse, track ball, touch screen, keyboard, a laser pointer, a stylus, a touch-sensitive display, a microphone and voice-recognition software, or an ocular tracking system that detects and tracks the movement of a user's eyes to determine which area of a display screen the user's eyes are focused upon, or any other type of device operatively enabled to select one or more web documents, for example, within a search results web page via a direct or indirect input from a user. Thus, while this disclosure may at times for convenience refer to a process of a user selecting a listing as "clicking" or a user's selection of a listing as a "click," the disclosure is not strictly limited to selecting a listing through a typical process of selecting by clicking a button on a mouse.

In some implementations, a returned search results web page may include one or more sponsored sections or portions incorporating a plurality of paid or sponsored advertisements, or listings, that may be related to users' queries. As used herein, a listing may be defined as an advertiser's audible and/or visible description of a product, a service, and/or an event.

Listings may typically, but not necessarily, include an embedded hyper-link that is selectable by a user to direct the user away from a publisher's sponsored search results web page and to a different web page that is associated with the listing. Listings may comprise, for example, selectable text links that may be arranged linearly down the page (e.g., from top to bottom) next to the returned search results. It should be appreciated that listings may include any form of advertisements utilized by an on-line advertising industry, such as static or animated banners (e.g., display advertisements), text messages, e-mail messages, etc., just to name a few examples. In addition, listings may include a title, an abstract, a product description, a logo, and/or other related objects to assist a search engine user in deciding whether to access a particular web document.

As was indicated, publishers or advertisement providers (e.g., search engine companies) may use one or more processes and/or transaction mechanisms to facilitate selling and/or pricing of their advertisement inventory or space to on-line advertisers. For example, a publisher may auction an advertising space on its search result web pages. An "auction," as the term used herein, may include an on-line and/or off-line market institution and/or transaction mechanism with an explicit set of rules (e.g., winner determination, pricing/payment, bid recording/managing, etc.) determining resource allocation and prices on the basis of bids from the market participants.

In a sponsored search auction, advertisers may select one or more keywords that are descriptive of a business that advertisers may wish to promote and/or that may be associated with products that advertisers may wish to sell. For a specific keyword, then, advertisers may submit bids—along with respective advertisements—stating their maximum willingness to pay, for example, when their advertisement is displayed (e.g., per-impression or CPM bidding and/or pricing) or clicked on (e.g., per-click or CPC bidding and/or pricing) by a search engine user. Under some circumstances, it may be desirable for an advertiser to pay a publisher conditioned on whether a search engine user completes a certain transaction on an advertiser's web site (e.g., per-action or CPA bidding and/or pricing), for example, by purchasing an advertised product, as previously mentioned.

Keywords and bids submitted by advertisers may be collected and/or stored in respective databases associated with advertiser accounts that may be maintained by an advertisement provider or publisher. If a search engine user searches a corpus of documents, for example, utilizing public networks (e.g., the Internet, the World Wide Web) or private networks (e.g., intranets) for a particular search term that matches a keyword on which advertisers placed their bids, a set of sponsored search advertisements or results may be displayed to a user on the returned search results page. As will be shown, sponsored search results may be ranked based, at least in part, on an expected revenue function of advertisers' bids and may be displayed in decreasing order of the bids with the winning advertisement displayed more prominently among other sponsored search results (e.g., most likely to be seen by a user and/or most likely to be clicked on, etc.).

In a sponsored search auction conducted by a publisher, a ranking of an advertiser's listing relative to other listings and a pricing of an advertiser's listing may be based on an advertiser's submitted bids for one or more keywords associated with the listing. In a sponsored search auction conducted by a publisher, a ranking of an advertiser's listing relative to other listings and a pricing of an advertiser's listing may also be based on a quality estimate of the listing. For purposes of this disclosure, a quality estimate of a listing may be determined, based at least in part, on an estimated probability of the listing being selected by a user that is exposed to the listing for a predetermined amount of time. Accurate representations of a quality of listings may assist with allocating advertising space to the listings and enhance revenue generation for a publisher.

In order to estimate the quality of a listing, feedback in the form of selections for the listing, or lack thereof, may be used. For purposes of this disclosure, a selection may be defined as a user's act of choosing a particular listing from among a plurality of listings that comprise a set of sponsored search results on a sponsored search page.

In order to collect feedback information to improve the quality estimate of new listings, it may be desirable to give new listings a certain amount of exposure to users, even if there is large uncertainty about their quality estimates. In this case, new listings may be those listings that have not received any exposure to users. Determining which listings should be given exposure and exactly how much exposure should be given to the new listings may be challenging.

For example, arbitrary initial quality estimates may be assigned to the new listings, which may result in one of two possible scenarios. The initial quality estimate may be less than or greater than an actual quality value for the listing. For new listings that are assigned initial quality estimates that are much lower than their actual quality values, such new listings may be ranked so low by a publisher that the new listings never receive enough exposure to enable a reliable estimate of quality. On the other hand, new listings that are assigned initial quality estimates that are much higher than their actual quality values may be given more exposure than is justified. Either one of these scenarios may not be desirable for a publisher.

One solution may be for a publisher to give all new listings sufficient exposure to users in order to obtain reliable estimates of quality of the listings, regardless of what the listings' initial quality estimates actually are. In other words, listings that have relatively low initial quality estimates may receive just as much exposure as listings having relatively high initial quality estimates. This approach, however, may be costly to the publisher. Since the publisher is giving valuable exposure to listings that may turn out to be of poor quality, the publisher may have squandered the opportunity to allocate advertising space to higher quality listings that may produce more revenue for the publisher.

FIG. 1 is a screenshot illustrating a sponsored search page 100 for the query terms "cell phone." Three sections 110, 120, and 130 of sponsored search page 100 are identified in FIG. 1. Section 110 includes search results that are gathered by the search engine from electronic documents that are available on the Internet and/or the World-Wide Web, based upon a query that is submitted to the search engine by the user.

Sections 120 and 130 of sponsored search page 100 include a plurality of listings that are submitted by advertisers. Due to the relative positions of sections 120 and 130 on the sponsored search page 100, section 120 may be referred to as the "north" section while section 130 may be referred to as the "east" section. Between sections 120 and 130, the "north" section 120 may be considered more desirable to advertisers than the "east" section 130 because a majority of users may review listings that appear on the left hand side of the sponsored search page 100 before reviewing the listings on the right hand side of the sponsored search page. Within the north section 120 and the east section 130 themselves, the uppermost positions in the sections may be considered relatively more desirable to an advertiser than the lowermost positions because a majority of users may review a listing that appears in a top portion of the north section 120 or a top portion of the east section 130 before reviewing listings that appear in a lower advertising position.

If the relative desirability of the advertising positions between and within north section 120 and east section 130 are assumed to be as described above, then the most desirable advertising position on sponsored search page 100 may be the topmost position of north section 120, while the least desirable advertising position may be the lowermost position of east section 130. In between, the second most desirable advertising position may be the second position from the top of the north section 120, the third most desirable advertising position may be the third position from the top of the north section, and so forth. The fifth most desirable advertising position may be the topmost position of east section 130, the sixth most desirable advertising position may be the second to the top position of the east section, and so forth as one descends down the advertising positions that are available in the east section.

It should be recognized that a desirability of the advertising positions described above for sponsored search page 100 are directed to a user who reads English, where it may be conventional to read from an upper left hand corner of a page to the lower right hand corner of a page. The desirability of advertising positions in sponsored search pages that are published in a particular language other than English may be different according to the conventions for that particular language.

Assuming that a quality of listings appearing in north section 120 and east section 130 of sponsored search page 100 is the same, placing a particular listing at a more desirable advertising position than another listing may yield more selections for the particular listing than the another listing because more desirable advertising positions typically draw more attention from users.

In actuality, respective qualities of different listings that are bidding for the same keyword may be, and typically are, different. A placement of a listing having a relatively low quality but a high bid at a desirable position may produce a lower yield for the publisher than placement of a high quality listing with a low bid at the same position, even though the publisher may charge a much higher price to the advertiser who has the high bid on a low quality listing. This is because the inherent low quality of the listing may counteract any advantage that the listing would otherwise receive by being placed in the desirable position. For this reason, publishers may attempt to balance both an advertiser's bid for a listing and a quality of a listing while allocating the available advertising inventory for a plurality of listings that are bidding on the same keyword.

In some implementations, sponsored search advertising inventory may be allocated by an auction. Suppose that there are n eligible advertiser listings for a particular keyword. Let $b_i$ represent an advertiser's bid for the particular keyword associated with listing i and let $q_i$ represent a quality estimate of listing i. The bid $b_i$ may be based, at least in part, on a price that an advertiser is willing to pay a publisher for each selection of listing i by a user. Thus, a bid $b_i$ may represent a whole, a fractional, or a mixed number of monetary units such as, for example, dollars, pounds, euros, pesos, yen, etc.

A ranking score $s_i$ may then be defined for each listing i as follows $$s_i = b_i \times q_i. \qquad (1)$$

Thus, as a simple illustration, suppose that two advertisers have each submitted bids to a publisher for a particular keyword. A first advertiser's bid, $b_1$, is an amount that the first advertiser is willing to pay a publisher when a first listing belonging to the first advertiser is selected by a user. A second advertiser's bid, $b_2$, is an amount that the second advertiser is willing to pay a publisher when a second listing belonging to the second advertiser is selected by a user. Assuming that a quality estimate $q_1$ for the first listing is equal to a quality estimate $q_2$ for the second listing, in accordance with expression (1) a ranking score $s_1$ and $s_2$ for the listings may depend only upon the bids $b_1$ and $b_2$, respectively.

The n eligible advertiser listings may be ranked by ranking score $s_i$, with a listing having a highest score allocated at the most desirable position, the listing with the next highest score allocated at the second-most desirable position, and so on. Therefore, an advertiser may need to increase its bid for a listing or improve a quality of a listing if it desires more selections for the listing, for example.

In order to conduct an auction, a publisher may generate a quality estimate $q_i$ for eligible listings. In some cases, a static model that uses features of a keyword and features of a listing may be used to predict a quality estimate $q_i$ for the listing. Alternatively, a quality estimate $q_i$ for eligible listings may be directly measured based, at least in part, on actual selections of the eligible listings received by actual users.

For a given keyword, there may be more eligible listings than available advertising inventory. Consider a scenario where a new listing of high actual quality enters an auction, but a static model assigns the listing a relatively low initial quality estimate $q_i$.

Further suppose that a static model assigns a relatively high weight to manufacturer names, but relatively little weight to names of products that are built by the manufacturers. Thus, a listing that includes the product name iPhone® but not the name of the manufacturer of the iPhone® may be assigned a relatively low quality estimate $q_i$, but in actuality the listing may have a relatively high quality estimate $q_i$. If the static model assigns a quality estimate $q_i$ to the listing that is too low, the listing may not rank high enough relative to other listings to even win a spot among the available advertising inventory, making it impossible for the publisher to receive sufficient feedback to update the quality estimate $q_i$ for the listing.

The failure to identify and show high quality listings as described above has several negative impacts. First, it results in lost revenue to the publisher, because valuable advertising inventory is allocated to lower quality listings that may not receive as many selections from the user, and therefore less may be charged to the advertiser. Second, users of the search engine may be shown less relevant results than they otherwise could have been shown, leading to lower user satisfaction. Third, new advertisers who possess high quality listings may be dissatisfied with the low volume of traffic that they receive, and in frustration may cease advertising with the publisher.

Accordingly, there is a need to give new listings with uncertain quality a certain amount of exposure. However, allocation of scarce advertising inventory to new listings in the presence of other listings of known quality may be a costly decision if the new listings are of poor quality.

Accordingly, as will be explained below, some example embodiments include a ranking scheme that explores the value of new listings while balancing benefits and costs. As will be explained below, other example embodiments include a charging scheme that effectively determines which party is to pay for the cost of the exploration of new listings, whether advertiser or publisher.

According to some example embodiments, a value associated with learning an actual quality of a listing may be quantified and taken into account in a ranking of new listings, and/or while pricing is determined through auction. According to some example embodiments, learning values $v_i$ are calculated for n eligible listings. For purposes of this disclosure, a learning value $v_i$ is defined as a quantitative measure of a benefit that is obtained by the publisher from learning additional information regarding a quality of a listing i.

Recall from expression (1) above that a ranking score $s_i$ for a listing i was defined as a product of a bid $b_i$ for the listing and a quality estimate $q_i$ for the listing. According to some example embodiments, a learning value $v_i$ is added to a ranking score $s_i$ to obtain a modified ranking score $s_i'$, as defined by expression (2) below.

$$s_i' = b_i \times q_i + v_i. \qquad (2)$$

By ranking new listings based upon a modified ranking score $s_i'$, example embodiments may more efficiently allocate advertising space to the new listings, capturing the future benefits of learning the quality of the new listings.

According to some example embodiments, a learning value $v_i$ may be related to a bid or a price that the advertiser is paying for the advertising space for the listing and/or to the bid or price that the advertiser is paying for the advertising space for other related listings. According to some example embodiments, a learning value $v_i$ may also be related to an amount of uncertainty that is associated with a quality estimate $q_i$ for the listing. For example, if a listing has already been displayed a statistically significant number of times, little uncertainty regarding its Click-Through-Rate, or CTR, may exist, and therefore an associated learning value $v_i$ may be small. On the other hand, a listing that has never before been shown may have a higher uncertainty and may therefore have a higher associated learning value $v_i$. For purposes of this disclosure, a "Click-Through Rate" (CTR) or "Click-Through Probability" (CTP) may be used interchangeably and may refer to a statistical probability that a search engine user will click on a listing given that the user looks at the listing. It should be noted that a CTR for a listing may be normalized for an advertising position of the listing within a sponsored search page.

According to particular example embodiments, a learning value $v_i$ may be proportional to a bid $b_i$ for a listing i, as the greater the bid is the more value may be extracted from the listing in the future if the listing turns out to be a high quality listing. In other words, the potential return on investment for exploring the quality of the listing may be greater if the bid for the listing is greater. According to particular example embodiments, a learning value $v_i$ may also be proportional to an uncertainty associated with a quality estimate $q_i$ for the listing, which may be represented by a standard deviation, or variance, of $q_i$, denoted by $\sigma_i$. Thus, according to some example embodiments a learning value $v_i$ may be determined by expression (3) as follows $$v_i = c \times b_i \times \sigma_i. \qquad (3)$$

In expression (3), c may be a constant parameter to adjust how much learning is desired, which will be explained in greater detail below, and $\sigma_i$ is an estimated variance of quality estimate $q_i$.

Variance $\sigma_i$ for the quality estimate $q_i$ may be estimated using any one of several methods depending on the way the quality estimate $q_i$ is determined. In the discussion below, a method of estimating variance $\sigma_i$ is outlined for a quality estimate $q_i$ calculated using a history of past exposures for the listing i. This method provides a reasonable estimate for the variance $\sigma_i$ in most practical situations. However, there may be cases where quality estimate $q_i$ for a listing i is estimated not only based on history of listing i, but also based on histories of listings in a group of similar listings, or also based on histories of other listings from the same advertisers. In short, other algorithms for estimating the variance $\sigma_i$ of the quality estimate $q_i$ are possible, and may be used without departing from claimed subject matter.

As pointed out above, a variance $\sigma_i$ for the quality estimate $q_i$ may take into account a past history, or exposure, of listing i. A listing may be shown to users many times. However, not all exposures are necessarily of equal value to a publisher. Recall from FIG. 1 that for a given listing, an exposure in north section 120 may have a higher value in terms of learning about its quality than an exposure in east section 130. Therefore, in aggregating exposures from historic data, example embodiments may take into account particular positions where the listing had been shown. To achieve this, some example embodiments use the concept of expected clicks based on position, which for particular implementations may be expressed as an average number of clicks that a listing of average quality receives at a particular position.

According to example embodiments, an amount of exposure $e_i$ for a listing i may be defined as a cumulative expected number of clicks based on the listing's exposure history. More specifically, suppose that there are M different advertising positions and their expected clicks are $m_1, m_2, \ldots, m_M$, respectively. According to one particular embodiment, one way to determine $m_j$ is to simply compute an overall CTR of all listings shown at position j. Suppose that a listing i has N exposures in the past at positions $x_1, x_2, \ldots, x_N$, respectively (note that $x_k$ belongs to $\{1, \ldots, M\}$). Then an amount of exposure $e_i$ for a listing i may be determined by expression (4) as follows:

$$e_i = \sum_{k=1}^{N} m_{x_k}. \qquad (4)$$

In one particular embodiment, an approach to estimating variance $\sigma_i$ for a quality estimate $q_i$ may be based on an assumption that a number of clicks received by a listing after a certain amount of exposure $e_i$ follows a Poisson distribution with parameter $\lambda = e_i q_i$. Under this approximation, estimated variance $\sigma_i$ may be determined by expression (5) as follows:

$$\sigma_i = \sqrt{\frac{q_i}{e_i}}. \qquad (5)$$

By substituting an estimated variance $\sigma_i$ determined by expression (5) into expression (3), a learning value $v_i$ for a listing i may be determined by expression (6) as follows:

$$v_i = c \times b_i \times \sqrt{\frac{q_i}{e_i}}. \qquad (6)$$

By substituting learning value $v_i$ determined by expression (6) into expression (2) and factoring out common terms, a modified ranking score $s_i'$ may be determined by expression (7) as follows:

$$s_i' = b_i \times \left( q_i + c \times \sqrt{\frac{q_i}{e_i}} \right). \qquad (7)$$

From expression (7), the term $$"\left( q_i + c \times \sqrt{\frac{q_i}{e_i}} \right)"$$

may represent a modified quality estimate, $q_i'$, to provide the following expression:

$$q_i' = q_i + c \times \sqrt{\frac{q_i}{e_i}}. \qquad (8)$$

Then, using expressions (1), (7), and (8), a simplified expression for a modified ranking score $s_i'$ may be determined by expression (9) as follows:

$$s_i' = b_i \times q_i'. \qquad (9)$$

Note that in expression (8) a modified quality estimate, $q_i'$ is obtained by adding a bonus term $c\sigma_i$ to an existing quality estimate $q_i$, eliminating a need to retrieve bid information. It should be understood, however, that this is merely an example of how a modified quality estimate may be computed with a bonus term, and claimed subject matter is not limited in this respect.

As was indicated above, constant parameter c may be used to adjust how much learning is desired. That is, constant parameter c may be tuned by running offline simulations and/or using bucket test results. Recall from expression (5) that a learning value $v_i$ may be proportional to constant parameter c. Thus, constant parameter c may be set to balance short term revenue against long term revenue and efficiency gain. For example, a greater c may lead to more exploration and more efficient allocation and higher future revenue at the expense of short term revenue; a smaller c may lead to less exploration and a longer time necessary to identify good quality listings.

An associated practical consideration is that a new listing i may have a very small exposure $e_i$, which means that an estimate of a variance $\sigma_i$ may be very large, thus overweighting new listing i in both ranking and pricing. In practice, therefore, some embodiments may cap a bonus term (e.g., $c\sigma_i$) that is to be combined with $q_i$ to provide a modified quality estimate $q_i'$ at some multiplier of its current quality estimate, for example. Thus, a maximum value for a bonus term ($c\sigma_i$) may be proportional to what it would otherwise be (without the learning value). As such, $q_i'$ may be determined according to expression (10) below, where the constant $\beta$ is a positive whole number:

$$q_i' = q_i + \min\left(c \times \sqrt{\frac{q_i}{e_i}}, \beta \times q_i\right). \quad (10)$$

In another example embodiment, a learning value may be used to specify how much advertisers should be charged for clicks of their listing. By doing so, example embodiments may reduce an advertisers need to resort to complicated bidding strategies to manipulate an auction system. Example embodiments also may determine which party (e.g., publisher or advertiser) is to pay for exploration of listings that have not yet received statistically significant exposure. Thus, auction revenues may be maintained at the same level or even increased, while simultaneously providing exploration opportunities for listings with relatively little exposure.

Specifics of a charging formula may depend on particular ways in which a learning value $v_i$ is calculated, but example embodiments may charge each advertiser a minimum amount they could bid for a listing and still win the same advertising slot in the auction. That is, an advertiser may submit a winning bid that is much greater than the next highest bid, but the advertiser may only be charged an amount $p_i$ for a listing i that is sufficient to overcome the next highest bid.

In some embodiments, if new listings are sorted based upon their modified ranking score $s_i'$ and re-indexed so that listing i is displayed in advertising slot i, then an amount $p_i$ that an advertiser will be charged for a selection of listing i may be determined by expression (11) as follows:

$$p_i = (b_{i+1} q'_{i+1})/q'_i = b_{i+1}(q_{i+1} + c\sigma_{i+1})/(q_i + c\sigma_i). \quad (11)$$

Since a listing i in lower slots may receive less exposure and therefore have a greater associated estimated variance $\sigma_1$, it may be seen that a charging scheme outlined by expression (11) may increase revenue from the auction. In fact, it is possible to analyze equilibria in a simple auction model based on the pricing formula of expression (11) and show that an overall revenue of an auction may increase, even though it may sometimes display listings having lower initial ranking scores based on expression (1) at more prominent positions.

Figure 2:
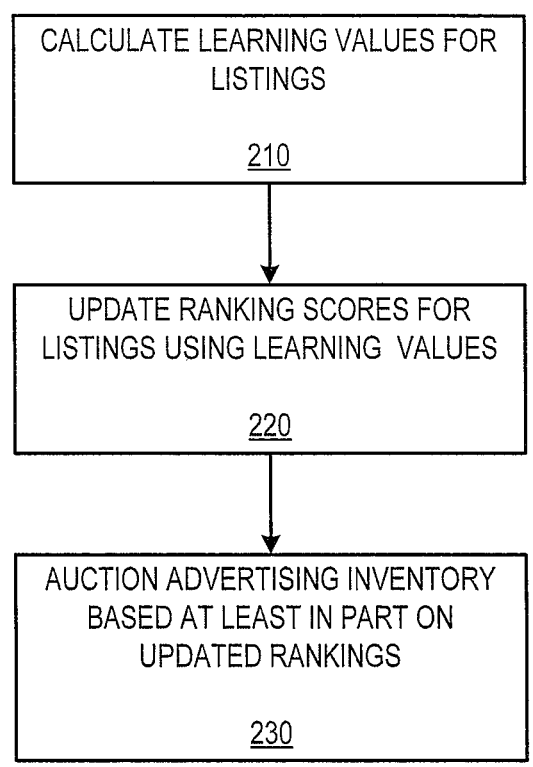
FIG. 2 is a flowchart illustrating a method of conducting an electronic auction according to example embodiments.

FIG. 2 is a flowchart illustrating a method 200 of conducting an electronic auction according to some example embodiments. Method 200 begins with process 210, where learning values are calculated for a plurality of new listings. According to some embodiments, learning values for new listings may be calculated using expression (6) above. Note that in expression (6), a learning value is dependent upon a quality estimate of a listing.

Next, in process 220, ranking scores for the listings are updated using the calculated learning values for the listings to obtain modified ranking scores for the listings. According to some embodiments, the modified ranking scores are determined according to expression (7) above.

Lastly, in process 230, an electronic auction is conducted to sell advertising inventory to advertisers associated with the listings, where the price that is charged to an advertiser for a selection of the listing is based, at least in part, on modified ranking scores. Process 230 may additionally include sorting new listings based upon their modified ranking scores and re-indexing new listings such that a listing with the greatest modified ranking score is placed in an advertising slot that has the most prominence. Similarly, the listing with the second greatest modified ranking score may be placed in the second-most prominent advertising slot, and so forth, for the remainder of the plurality of the listings.

Figure 3:
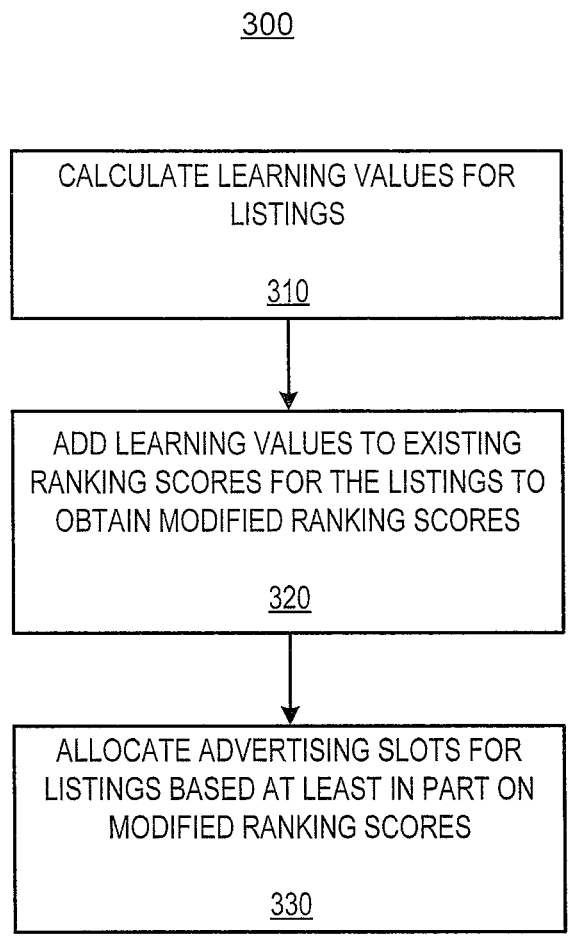
FIG. 3 is a flowchart illustrating a method of allocating advertising inventory on a sponsored search result page according to example embodiments.

FIG. 3 is a flowchart illustrating a method 300 of allocating advertising inventory on a sponsored search result page among a plurality of new listings based at least in part on calculating learning values for the new listings. Method 300 begins with process 310, where learning values are calculated for a plurality of new listings. According to some embodiments, the learning values for the new listings may be determined according to expression (6) above. Note that in expression (6), a learning value $v_i$ is dependent upon a quality estimate for the listing. For purposes of this disclosure, a learning value $v_i$ may be defined as a quantitative measure of a benefit that is obtained by the publisher from learning more about a quality of a listing i.

Next, in process 320, calculated learning values may be combined with a ranking score for the listings to obtain modified ranking scores for the listings. According to some embodiments, modified ranking scores may be determined according to expression (7) above.

Finally, in process 330, advertising slots for the new listings may be allocated among the new listings based, at least in part, on the modified ranking scores. Process 330 may additionally include sorting the new listings based upon their modified ranking scores and re-indexing the new listings such that the listing with the greatest modified ranking score is placed in the advertising slot that receives the greatest exposure. Similarly, the listing with the second greatest modified ranking score may be placed in the advertising slot with the second greatest exposure, and so forth, for the remainder of the plurality of the listings.

Figure 4:
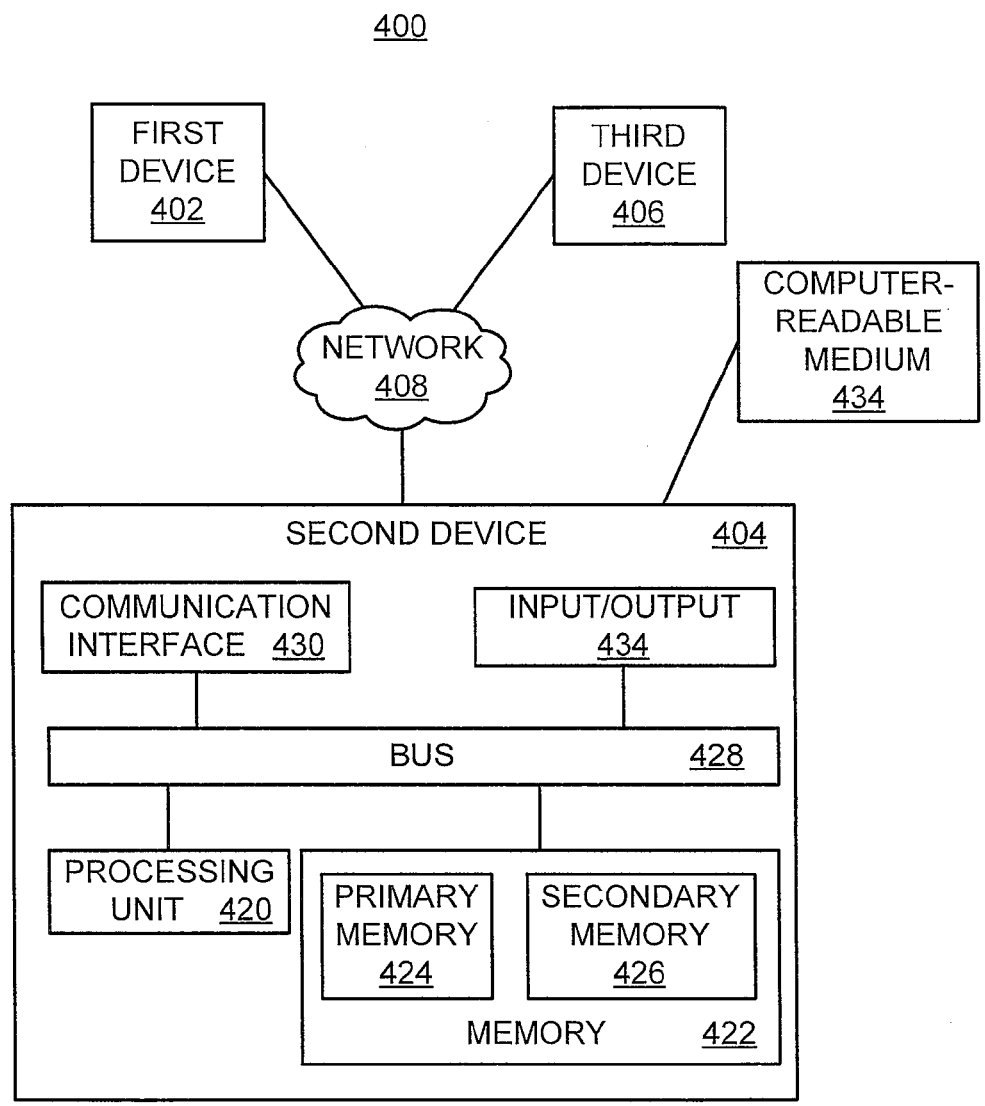
FIG. 4 is a schematic diagram illustrating a system including special purpose computing platforms configurable to execute all or portions of the processes illustrated in FIGS. 2 and 3.

FIG. 4 is a schematic diagram illustrating a system 400 including special purpose computing platforms configurable to execute all or a portion of an electronic auction for sponsored searches using one or more techniques illustrated above, for example. In a particular example, although claimed subject matter is not limited in this respect, such an electronic auction may be implemented to process queries or requests that are received from devices coupled to network 408. System 400 may include, for example, a first device 402, a second device 404 and a third device 406, which may be operatively coupled together through the network 408.

In a particular example embodiment, the functionality illustrated in the flowchart of FIG. 2 may be centrally implemented by the processing unit 420 of the secondary device 404 by executing instructions stored in the primary memory 424. According to other embodiments, the functionality illustrated in the flowchart of FIG. 2 may be distributed across multiple ones of the first, second, and third devices 402, 404, and 406 that are linked by the network 408. These examples are presented for purposes of illustration and not for limitation, thus the claimed subject matter is not so limited.

First device 402, second device 404 and third device 402, as shown in FIG. 4, may be representative of any device, appliance or machine that may be configurable to exchange data over network 408. By way of example but not limitation, any of first device 402, second device 404, or third device 402 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 408, as shown in FIG. 4, is representative of one or more communication links, processes, and/or resources configurable to support the exchange of data between at least two of first device 402, second device 404, and third device 406. By way of example but not limitation, network 408 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 406, there may be additional like devices operatively coupled to network 408.

It is recognized that all or part of the various devices and networks shown in system 400, and the processes and methods as further described herein, may be implemented using or otherwise include hardware, firmware, software, or any combination thereof.

Thus, by way of example but not limitation, second device 404 may include at least one processing unit 420 that is operatively coupled to a memory 422 through a bus 428.

Processing unit 420 is representative of one or more circuits configurable to perform at least a portion of a data computing procedure or process. By way of example but not limitation, processing unit 420 may include one or more processors, controllers, microprocessors, microcontrollers, application specific integrated circuits, digital signal processors, programmable logic devices, field programmable gate arrays, and the like, or any combination thereof.

Memory 422 is representative of any data storage mechanism. Memory 422 may include, for example, a primary memory 424 and/or a secondary memory 426. Primary memory 424 may include, for example, a random access memory, read only memory, etc. While illustrated in this example as being separate from processing unit 420, it should be understood that all or part of primary memory 424 may be provided within or otherwise co-located/coupled with processing unit 420.

Secondary memory 426 may include, for example, the same or similar type of memory as primary memory and/or one or more data storage devices or systems, such as, for example, a disk drive, an optical disc drive, a tape drive, a solid state memory drive, etc. In certain implementations, secondary memory 426 may be operatively receptive of or otherwise configurable to couple to, a computer-readable medium 434. Computer-readable medium 434 may include, for example, any medium that can carry and/or make accessible data, code and/or instructions for one or more of the devices in system 400.

Second device 404 may include, for example, a communication interface 430 that provides for or otherwise supports the operative coupling of second device 404 to at least network 408. By way of example but not limitation, communication interface 430 may include a network interface device or card, a modem, a router, a switch, a transceiver, and the like.

Second device 404 may include, for example, an input/output 432. Input/output 432 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 432 may include an operatively configured display, keyboard, mouse, trackball, touch screen, etc.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the detailed description presented above, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the above detailed description were presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated.

For example, one or more portions of a memory device may store signals representative of data and/or information as expressed by a particular state of the memory device. In an implementation, an electronic signal representative of data and/or information may be "stored" in a portion of a memory device by affecting or changing the state of such portions of the memory device to represent data and/or information as binary information (e.g., ones and zeros). As such, in a particular implementation, such a change of state of the portion of memory to store a signal representative of data and/or information constitutes a transformation of a memory device to a different state or thing.

It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the foregoing discussion, it is appreciated that throughout this specification discussions utilizing terms such as "processing," "computing," "calculating," "associating," "identifying," "determining," "allocating," "generating," and/or the like refer to the actions and/or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," "and/or," and "or" as used herein may include a variety of meanings that will depend at least in part upon the context in which it is used. Typically, "and/or" as well as "or" if used to associate a list, such as A, B and/or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

While there have been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method of executing computer instructions on at least one computing device in which the at least one computing device includes at least processor and at least one memory, the method comprising:
   executing the computer instructions, stored in at least one memory of the at least one computing device, on the at least one processor of the at least one computing device; and
   storing in the at least one memory of the at least one computing device any results of having executed the computer instructions on the at least one processor of the at least one computing device;
   wherein the computer instructions to be executed comprise instructions for execution of an electronic auction;
   wherein the executing the computer instructions further comprises:
      generating one or more binary digital signals comprising an initial ranking score for a bid of a media listing, the bid comprising at least a bid price offered for the media listing, the ranking score based on the bid price and an estimated probability of user selection of the media listing;
      generating one or more binary digital signals comprising a learning value for the bid for the media listing, the learning value determined based on a product of the bid price and an estimated uncertainty of the estimated probability of user selection of the media listing;
      generating one or more binary digital signals comprising a modified ranking score for the bid for the media listing based on a sum of the initial ranking score and the learning value;
      generating one or more binary digital signals to electronically auction media inventory to purchasers associated with the listings based on the modified ranking score; and
      generating one or more binary signals to charge a winner of the auction for the media listing.

2. The method of claim 1, wherein the learning value is proportional to the estimated uncertainty of the estimated probability of user selection of the media listing.

3. The method of claim 2, wherein the learning value is dependent at least partially upon a plurality of offered bids associated with the listing.

4. The method of claim 3, wherein the learning value is substantially proportional to the offered bids associated with the listing.

5. The method of claim 3, wherein the executing the computer instructions further comprises:
   multiplying a constant by the bid price associated with at least one of the listings, wherein the constant comprises a parameter that is used to adjust an amount of learning; and
   multiplying a product of the constant and the bid price with the estimated variance of the quality parameter.

6. The method of claim 1, wherein the executing the computer instructions further comprises calculating the quality parameter using a history of previous exposures for the listing.

7. The method of claim 1, wherein the learning value is proportional to an uncertainty value associated with a quality estimate for the listing, wherein the uncertainty value is based at least in part on a number of times that the listing has been displayed to one or more users.

8. A system comprising:
   at least one computing device, the at least one computing device including at least one processor and at least one memory; the at least one computing device to execute computer instructions on the at least one processor, the computer instructions to be executed having been stored in the at least one memory, the computer instructions to be for execution on the at least one processor and the at least one computing device to store in the at least one memory of the at least one computing device any results to be generated from the execution on the at least one processor of the to be executed computer instructions;

wherein the media computer instructions to be executed comprise instructions for execution of an electronic auction;

wherein the execution of the media computer instructions are to:

generate one or more binary digital signals to comprise an initial ranking score for a bid of a media listing, the bid to comprise at least a bid price to be offered for the media listing, the ranking score to be based on the bid price and an estimated probability of user selection of the media listing;

generate one or more binary digital signals to comprise a learning value for the bid for the media listing, the learning value to be determined based on a product of the bid price and an estimated uncertainty of the estimated probability of user selection of the media listing;

generate one or more binary digital signals comprising a learning value for the bid for the media listing, the learning value determined based on a product of the bid price and an estimated uncertainty of the estimated probability of user selection of the media listing;

generate one or more binary digital signals to comprise a modified ranking score for the bid for the media listing based on a sum of the initial ranking score and the learning value;

generate one or more binary digital signals to electronically auction media inventory to purchasers associated with the listings based on the modified ranking score; and generate one or more binary signals to charge a winner of the auction for the media listing.

9. The system of claim 8, the learning value to comprise a product of a constant, the bid price for the listing, and the estimated variance of the quality parameter for the listing, the constant to comprise a parameter to adjust an amount of learning.

10. The system of claim 9, wherein the estimated uncertainty of the estimated probability of user selection for the listing is to be estimated based upon an exposure for the listing, where the exposure for the listing is to be generated as a cumulative user selections to be expected for the listing to be based on an exposure history of the listing.

11. The system of claim 10, wherein an amount of exposure for the listing is to be estimated based, at least in part, on a relation $$e_i = \sum_{k=1}^{N} m_{x_k},$$

where for a listing, i, m is to comprise an expected clicks for the listing, and where x is to comprise a position of the listing in a position k between 1 and N.

12. The system of claim 10, wherein the estimated variance is to be estimated based on an assumption that clicks to be received by the listing after the exposure is to follow a Poisson distribution with a Poisson parameter that is to comprise a product of the exposure of the listing and the estimated probability of user selection of the listing.

13. The system of claim 12, wherein the estimated uncertainty of the estimated probability of user selection is to be estimated based, at least in part, on a relation $$\sigma_i = \sqrt{\frac{q_i}{e_i}}.$$

where for a listing, i, σ is to comprise the variance of the listing, q is to comprise a estimated probability of user selection of the listing, and e is to comprise exposure of the listing.

14. The system of claim 13, wherein the learning value is to be estimated as a product of the constant, the bid price for the listing, and a square root of a quotient of the estimated probability of user selection of the listing and the exposure of the listing.

15. An article comprising:

a non-transitory machine-readable medium having instructions stored thereon by at least one computing device, the at least one computing device comprising at least one processor and at least one memory, the instructions to be executable to:

execute computer instructions on the at least one processor, the computer instructions to be executed having been stored in the at least one memory, the computer instructions to be for execution on the at least one processor and the at least one computing device to store in the at least one memory of the at least one computing device any results to be generated from the execution on the at least one processor of the to be executed computer instructions;

wherein the computer instructions to be executed comprise instructions for execution of an electronic auction;

wherein the execution of the computer instructions are to:

generate one or more binary digital signals to comprise an initial ranking score for a bid of a media listing, the bid to comprise at least a bid price offered for the media listing, the ranking score to be based on the bid price and an estimated probability of user selection of the media listing;

generate one or more binary digital signals to comprise a learning value for the bid for the media listing, the learning value to be determined based on a product of the bid price and an estimated variance of the quality estimate for the media listing, wherein the estimated uncertainty of the estimated probability of user selection of the media listing;

generate one or more binary digital signals to comprise a modified ranking score for the bid for the media listing based, on a sum of the initial ranking score and the earning value;

generate one or more binary digital signals to electronically auction media inventory to purchasers associated with the listings based on the modified ranking score; and generate one or more binary signals to charge a winner of the auction for the media listing.

16. the article of claim 15, wherein the execution of the computer instructions are to electronically auction media inventory with a price to be generated for user selections of a listing, the price to be charged to an entity associated with the listing, the price to be based at least in part upon a minimum amount the entity could have bid and won a slot at the auction.

17. The article of claim 15, wherein the execution of the computer instructions are to calculate a modified estimated probability of user selection of the listing, the modified quality parameter to be obtained substantially in accordance with a bonus term to sum with a estimated probability of user selection of the listing, the bonus term to comprise a constant multiplied by the estimated variance of the estimated probability of user selection of the listing.

18. The article of claim 17, wherein the to generate one or more binary digital signals to comprise the modified estimated probability of user selection of the listing to comprise the bonus term to be limited such that it does not exceed a positive number multiple of the estimated probability of user selection of the listing.

19. The article of claim 15, wherein the execution of the computer instructions are to further:
 sort listings to be based upon modified ranking scores; and index the listings such that an $i^{th}$ listing is to be displayed in an $i^{th}$ media slot, wherein listings with greater updated ranking scores are to be displayed in media slots that have more prominent position.

\* \* \* \* \*